United States Patent
Vos

(10) Patent No.: US 11,595,976 B2
(45) Date of Patent: Feb. 28, 2023

(54) METHOD AND APPARATUS FOR MULTI-TRANSPORT BLOCK GRANT TRANSMISSIONS

(71) Applicant: Sierra Wireless, Inc., Richmond (CA)

(72) Inventor: Gustav Gerald Vos, Surrey (CA)

(73) Assignee: SIERRA WIRELESS, INC., Richmond (CA)

( * ) Notice: Subject to any disclaimer, the term of this patent is extended or adjusted under 35 U.S.C. 154(b) by 0 days.

(21) Appl. No.: 16/537,152

(22) Filed: Aug. 9, 2019

(65) Prior Publication Data

US 2020/0053769 A1 Feb. 13, 2020

Related U.S. Application Data

(60) Provisional application No. 62/716,463, filed on Aug. 9, 2018.

(51) Int. Cl.

| H04W 72/04 | (2009.01) |
|---|---|
| H04L 1/16 | (2006.01) |
| H04L 27/00 | (2006.01) |
| H04W 72/1263 | (2023.01) |
| H04W 72/0446 | (2023.01) |

(Continued)

(52) U.S. Cl.
CPC ....... H04W 72/1263 (2013.01); H04L 1/0005 (2013.01); H04L 1/0071 (2013.01); H04L 1/1819 (2013.01); H04W 72/042 (2013.01); H04W 72/0446 (2013.01); H04W 72/14 (2013.01); *H04W 88/02* (2013.01)

(58) Field of Classification Search
CPC ........ H04W 72/1242; H04W 72/1289; H04W 72/1273; H04W 72/14; H04W 72/1263; H04W 72/042; H04W 72/0446; H04W 88/02; H04L 1/1614; H04L 5/0094; H04L 1/1864; H04L 1/0005; H04L 1/0071; H04L 1/1819; H04L 27/0006; H04L 5/0048; H04L 1/0041; H04B 7/2606

USPC .......................................................... 370/329
See application file for complete search history.

(56) References Cited

U.S. PATENT DOCUMENTS

| 8,588,142 B2 | 11/2013 | Seo et al. |
| 9,043,666 B2 | 5/2015 | Kotecha et al. |

(Continued)

FOREIGN PATENT DOCUMENTS

| EP | 3 272 050 | 12/2018 |
| WO | WO 2010/039738 | 4/2010 |

(Continued)

OTHER PUBLICATIONS

International Search Report and Written Opinion for PCT/CA2019/051095, dated Nov. 7, 2019.

(Continued)

*Primary Examiner* — Edan Orgad
*Assistant Examiner* — Vanneilian Lalchinthang
(74) *Attorney, Agent, or Firm* — Shackelford, Bowen, McKinley & Norton, LLP

(57) ABSTRACT

There is provided a method and system for transmitting control information for user equipment. According to embodiments there is provided a method and apparatus for enabling multi-transport block scheduling with time diversity. According to embodiments, there is provided a method and apparatus for managing multi-transport block transmission.

12 Claims, 7 Drawing Sheets

(51) Int. Cl.
*H04L 1/00* (2006.01)
*H04L 1/1812* (2023.01)
*H04W 72/14* (2009.01)
*H04W 88/02* (2009.01)

(56) References Cited

U.S. PATENT DOCUMENTS

| | | | |
|---|---|---|---|
| 9,706,567 | B2 | 7/2017 | Yang et al. |
| 9,907,062 | B2 | 2/2018 | McBeath et al. |
| 9,912,504 | B2 | 3/2018 | Krzymien et al. |
| 2009/0307554 | A1 | 12/2009 | Marinier et al. |
| 2010/0064061 | A1 | 3/2010 | Warren et al. |
| 2010/0098006 | A1 | 4/2010 | Golitschek Edler Von Elbwart et al. |
| 2010/0251054 | A1 | 9/2010 | Cai et al. |
| 2010/0260130 | A1 | 10/2010 | Earnshaw et al. |
| 2010/0281486 | A1 | 11/2010 | Lu et al. |
| 2011/0122825 | A1 | 5/2011 | Lee et al. |
| 2011/0243039 | A1 | 10/2011 | Papasakellariou et al. |
| 2011/0300854 | A1 | 12/2011 | Shan et al. |
| 2012/0033650 | A1 | 2/2012 | Ahn et al. |
| 2012/0195267 | A1 | 8/2012 | Dai et al. |
| 2012/0300616 | A1* | 11/2012 | Zeng ............... H04W 72/1289 370/216 |
| 2013/0235812 | A1 | 9/2013 | Heo et al. |
| 2014/0153484 | A1* | 6/2014 | Kim ................. H04L 27/34 370/328 |
| 2014/0269452 | A1 | 9/2014 | Papasakellariou et al. |
| 2014/0293893 | A1 | 10/2014 | Papasakellariou et al. |
| 2014/0321418 | A1 | 10/2014 | Rinne et al. |
| 2015/0098370 | A1 | 4/2015 | Lee et al. |
| 2015/0098418 | A1 | 4/2015 | Vajapeyam et al. |
| 2015/0200751 | A1 | 7/2015 | Yin et al. |
| 2015/0264678 | A1 | 9/2015 | Yin et al. |
| 2015/0280876 | A1* | 10/2015 | You ................. H04L 1/1812 370/329 |
| 2015/0305003 | A1 | 10/2015 | Chen et al. |
| 2016/0037524 | A1* | 2/2016 | Krzymien ......... H04L 1/1896 370/329 |
| 2016/0095133 | A1 | 3/2016 | Hwang et al. |
| 2017/0094644 | A1 | 3/2017 | Vos et al. |
| 2017/0302493 | A1 | 10/2017 | Yang et al. |
| 2018/0006791 | A1* | 1/2018 | Marinier ............ H04L 1/1893 |
| 2018/0176945 | A1 | 6/2018 | Cao et al. |
| 2018/0234212 | A1 | 8/2018 | Park et al. |
| 2019/0075589 | A1* | 3/2019 | Jeon ................ H04W 72/1278 |
| 2019/0141778 | A1* | 5/2019 | Pedersen ............ H04W 76/28 |
| 2019/0149274 | A1* | 5/2019 | Freda .............. H04W 72/0453 370/329 |
| 2019/0268930 | A1* | 8/2019 | Rudolf ............. H04W 72/1242 |
| 2020/0053750 | A1 | 2/2020 | Vos |
| 2020/0053769 | A1 | 2/2020 | Vos |
| 2020/0178288 | A1* | 6/2020 | Chang .............. H04W 72/0446 |
| 2020/0389873 | A1* | 12/2020 | Liu ....................... H04L 1/16 |
| 2021/0105099 | A1 | 4/2021 | Vos et al. |

FOREIGN PATENT DOCUMENTS

| | | |
|---|---|---|
| WO | WO-2011094926 A1 | 8/2011 |
| WO | WO 2017/049413 | 3/2017 |
| WO | WO-2017194822 A1 | 11/2017 |
| WO | WO 2018/085717 | 5/2018 |
| WO | WO-2020028993 A1 | 2/2020 |
| WO | WO 2020/145652 | 7/2020 |
| WO | WO 2020/204376 | 10/2020 |
| WO | WO 2021/062551 | 4/2021 |

OTHER PUBLICATIONS

Office Action for U.S. Appl. No. 16/536,964, dated Jan. 8, 2021.
Office Action for U.S. Appl. No. 16/536,964, dated Apr. 30, 2021.
"Rel-16 MTC enhancements for LTE", 3GPP TSG RAN Meeting #8, La Jolla, USA, Jun. 11-14, 2018 (RP-181450).
Technical Specification entitled "3rd Generation Partnership Project: Technical Specification Group Radio Access Network: Evolved Universal Terrestrial Radio Access (E-UTRA); Multiplexing and channel coding (Release 12)" 3GPP TS 36.212 V12.5.0 (Jun. 2015).
"Performance of Time Diversity for PUSCH and HARQ Impacts", R1-154489, 3GPP TSG RAN WG1 Meeting #82, Beigin, China, Aug. 24-28, 2015.
"PUSCH Summary RAN #1 80bis", Sierra Wireless, R1-152301, 3GPP TSG RAN WG1 Meeting #80bis, Belgrade, Serbia, Apr. 20-24, 2015.
"PUSCH Summary of Submitted Tdocs on RAN#81", R1-153494, 3GPP TSG-RAN WG1 Meeting 81, Fukuoka, May 25-29, 2015.
"Coverage enhancements for M-PDCCH", R1-152615, 3GPP TSG RAN WG1 Meeting #81, Fukuoka, Japan, May 25-29, 2015.
"Performance of M-PDCCH with frequency offset", R1-153083, 3GPP TSG-RAN WG1 Meeting #81, Fukuoka, Japan, May 25-29, 2015.
International Search Report dated Dec. 18, 2020 for PCT/CA2020/051322 (Corresponding to WO 2021/062551).
Written Opinion dated Dec. 18, 2020 for PCT/CA2020/051322 (Corresponding to WO 2021/062551).
International Search Report dated Dec. 19, 2016 for PCT/CA2016/051124 (WO 2017/049413).
Written Opinion dated Dec. 19, 2016 for PCT/CA2016/051124 (WO 2017/049413).
U.S. Office Action dated Jul. 20, 2018 for U.S. Appl. No. 15/276,053 (US20170094644).
U.S. Notice of Allowance dated Oct. 29, 2018 for U.S. Appl. No. 15/276,053 (US20170094644).
U.S. Office Action dated Sep. 15, 2021 for U.S. Appl. No. 16/536,964 (US20200053750).
U.S. Office Action dated Nov. 12, 2021 for U.S. Appl. No. 17/062,161 (US 2021/0105099).
U.S. Notice of Allowance dated Mar. 10, 2022 for U.S. Appl. No. 17/062,161 (US 2021/0105099).
Search Report for European Patent App. No. 19846668.2, dated Apr. 25, 2022.
Sierra Wireless: "DCI Requirements to support Time Diversity", R1-155684, XP051041745, Sep. 25, 2015.
Samsung: "Procedures for Grant-Based UL Transmissions", R1-1710722, XP051304352, Jun. 16, 2017.

* cited by examiner

FIG. 4A
FIG. 4B
FIG. 5A
FIG. 5B
FIG. 5C

METHOD AND APPARATUS FOR MULTI-TRANSPORT BLOCK GRANT TRANSMISSIONS

CROSS REFERENCE TO RELATED APPLICATIONS

This application claims the benefit of priority to U.S. Patent Application Ser. No. 62/716,463 entitled "Method and Apparatus for Multi-Transport Block Grant Transmissions" filed Aug. 9, 2018, which is hereby incorporated by reference in its entirety.

FIELD OF THE INVENTION

The present invention pertains in general to wireless communication systems operating according to standards such as the Long Term Evolution (LTE), and in particular to mechanisms for multi-transport block grant transmissions for Category M User Equipment (UE).

BACKGROUND

The Long Term Evolution (LTE) wireless communication standard offers a high-capacity, high-speed wireless interface for use by mobile phones, data terminals, machine-type-communication (MTC) or machine-to-machine (M2M) equipment, and the like. However, in some instances it may be desirable to sacrifice aspects of an LTE terminal's performance, for example data capacity, in order to gain other benefits, such as reduced complexity and/or cost. The $3^{rd}$ Generation Partnership Project has considered such possibilities, for example in connection with "low-cost" or "limited capability" User Equipment (UE), also referred to as a CAT-M UE.

The 3GPP (Third Generation Partnership Project) standards committees have recognized the need for LTE to support very large numbers of M2M user equipment (UEs) and have identified objectives for modifications to the existing LTE standards designed to support very large numbers of M2M UEs. Common requirements for such modifications are that they maintain compatibility with existing devices and limit the impact of M2M traffic on the high data rate and low latency requirements of current and future users.

In Release 15 or earlier, multiple transport blocks (TBs) must be scheduled individually. For example, with reference to FIG. 1, TBs with 4 repeats each are illustrated, wherein each set of TB repeats, e.g. four TB1s 110 and four TB2s 120 occur after a grant 105, 115. It is noted that the configuration as illustrated in FIG. 1, there are a lot of unused sub-frames (SF) which slows the data rate and uses a lot of MTC physical downlink control channel (MPDCCH) resources to schedule each grant. 3GPP has agreed that Multi-TB scheduling via a multi-TB grant (MTBG) could be specified in Rel 16 for LTE-M (RP-181450) and NB-IOT (RP-181450). Allowing multiple TBs per grant will result in more efficient scheduling as illustrated in FIG. 2, wherein there are 8 TBs with 4 repeats each, e.g.; four TB1 205, four TB2 210 and four TB3 215. However, the configuration illustrated in FIG. 2 would not allow the use of "time diversity". Furthermore, as an LTE-M device is to be simple in design, a UE configured as a LTE-M device typically cannot do blind decoding of the MPDCCH for different sized DCI messages, for example grants.

Therefore there is a need for a method and system for transmitting control information for Category M User Equipment (UE) that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide a method and apparatus for multi-transport block grant transmissions. In accordance with an aspect of the present invention, there is provided a method for facilitating time diversity for multi-transport block grant (MTBG) transmissions in a Long Term Evolution, LTE, system. The method includes transmitting, by a user equipment, UE, a first set of transport blocks and ceasing transmission for a predetermined period of time. The method further includes transmitting, by the UE, a second set of transport blocks, wherein the summation of the first set of transport blocks and the second set of transport blocks defines a complete set of transport blocks.

In accordance with an aspect of the present invention there is provided a user equipment (UE) that includes a processor and machine readable memory. The machine readable memory storing machine executable instructions which when executed by the processor configure the UE to transmit a first set of transport blocks and cease transmission for a predetermined period of time. The machine executable instructions which when executed by the processor further configure the UE to transmit a second set of transport blocks, wherein the summation of the first set of transport blocks and the second set of transport blocks defines a complete set of transport blocks.

In some embodiments, the transmitting the second set of transport blocks further includes transmitting, by the UE, a first portion of the second set of transport blocks and ceasing transmission for a second predetermined period of time. The transmitting the second set of transport blocks further includes transmitting, by the UE, a second portion of the second set of transport blocks, wherein the summation of the first portion and the second portion defines a complete set of the second set of transport blocks.

In accordance with an aspect of the present invention there is provided a method for granting multi-transport block grant (MTBG) transmissions in a wireless communication system. The method includes generating, by a base station, a downlink control information, DCI, the DCI including at least one multi-transport block identifier, the DCI for transmission with a grant. The method further includes transmitting, by the base station, the DCI to a user equipment, UE.

In accordance with an aspect of the present invention, there is provided a base station including a processor and machine readable memory storing machine executable instructions. The machine executable instructions, when executed by the processor configure the base station to generate a downlink control information, DCI, the DCI including at least one multi-transport block identifier, the DCI for transmission with a grant and transmit the DCI to a user equipment, UE.

In accordance with an aspect of the present invention, there is provided a method for multi-transport block transmissions in a wireless communication system. The method receiving, by a user equipment, UE, a downlink control information, DCI, the DCI including at least one multi-transport block identifier, wherein the DCI is received with a grant. The method further includes configuring, by the UE, the multi-transport block transmission, the configuring based at least in part on the at least one multi-transport block identifier and transmitting, by the UE, the multi-transport block transmission to a base station.

In accordance with an aspect of the present invention, there is provided a user equipment, UE, including a processor and machine readable memory storing machine executable instructions. The machine executable instructions, when executed by the processor configure the UE to receive a downlink control information, DCI, the DCI including at least one multi-transport block identifier, wherein the DCI is received with a grant. The machine executable instructions, when executed by the processor further configure the UE to configure the multi-transport block transmission, the configuring based at least in part on the at least one multi-transport block identifier and transmit the multi-transport block transmission to a base station.

BRIEF DESCRIPTION OF THE FIGURES

These and other features of the invention will become more apparent in the following detailed description in which reference is made to the appended drawings.

FIG. 4A illustrates a time line for multi TB repetition after Grant in an LTE system, where the 4 time repetition of 8 TBs is interleaved, in accordance with embodiments of the present invention.

FIG. 4B illustrates a time line for multi TB repetition after Grant in an LTE system, where the 4 time repetition of 2 TBs is interleaved, in accordance with embodiments of the present invention.

FIG. 5A illustrates a time line for multi TB repetition after Grant in an LTE system, where the 4 time repetition of 2 TBs is interleaved, in accordance with embodiments of the present invention.

FIG. 5B illustrates a time line for multi TB repetition after Grant in an LTE system, where the 4 time repetition of 2 TBs is interleaved including a gap between repetitions, in accordance with embodiments of the present invention.

FIG. 5C illustrates a time line for multi TB repetition after Grant in an LTE system, where the 4 time repetition of 2 TBs is interleaved including a gap after the second repetition, in accordance with embodiments of the present invention.

DETAILED DESCRIPTION

The present invention provides a method and system for enabling multi-transport block scheduling. The present invention further provides a method and system for enabling multi-transport block scheduling with time diversity.

A MTBG typically should be used when more than the maximum single transport block size (TBS) (e.g. 1000 bits) needs to be sent. Since >1000 bits may not always be available, it can important that both single transport block grant (STBG) and multi-transport block grant (MTBG) be supported dynamically when the MTBG feature is enabled. As such according to some embodiments, the MTBG feature can be configured or enabled by radio resource control (RRC). According to some embodiments, when the MTBG is configured or enabled, both single TB grant (STBG) and MTBG are supported.

Figure 1:
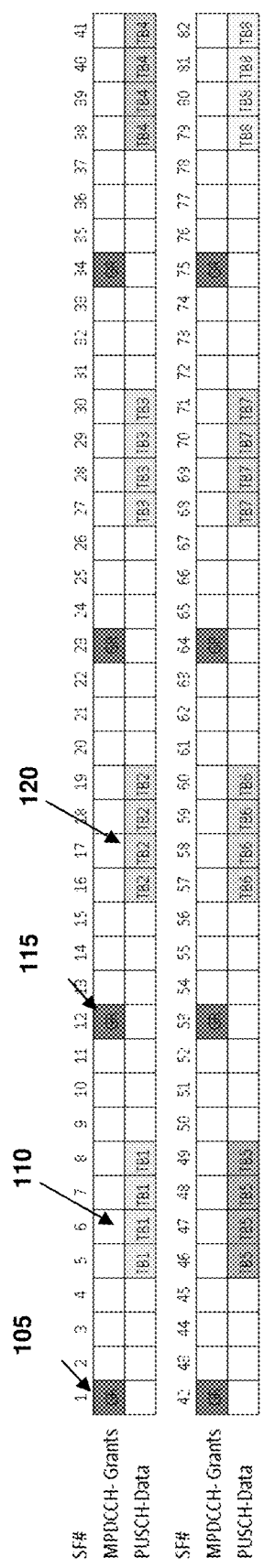
FIG. 1 illustrates a time line for Transmission Block (TB) repetition after Grant in an LTE system according to the prior art.
Figure 2:
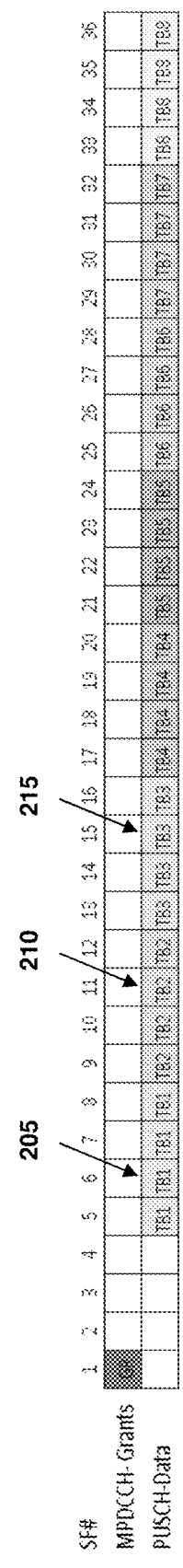
FIG. 2 illustrates a time line for multi TB repetition after Grant in an LTE system, in accordance with embodiments of the present invention.
Figure 3:
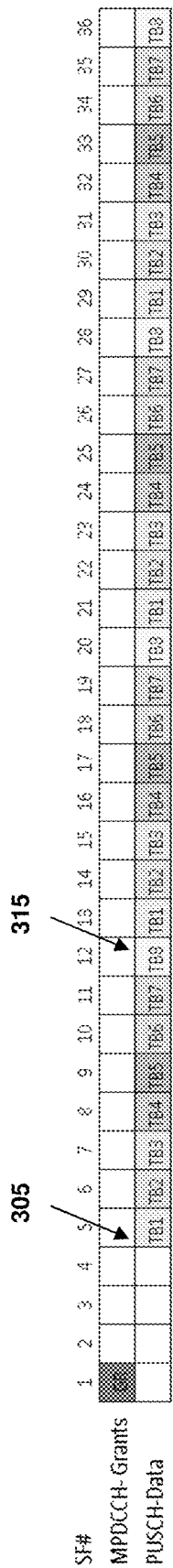
FIG. 3 illustrates a time line for multi TB repetition after Grant in an LTE system, where the repetition of the TBs is interleaved, in accordance with embodiments of the present invention.

As noted above, the configuration illustrated in FIG. 2 would not allow the use of "time diversity". According to embodiments, another organization of SFs would be to interleave the repetitions as illustrated in FIG. 3 thereby increasing time diversity. In this figure it can be noted that TB1 305, TB2 310 ... TB8 315 are transmitted sequentially, and subsequently each of the repeats thereof are also transmitted sequentially.

In order to determine how much gain is achieved by interleaving of TBs, physical uplink shared channel (PUSCH) Link Level Simulations (LLS) were conducted. TABLE 1 shows the signal to noise ratio (SNR) gains using interleaved TBs at the 10% block error rate (BLER) point for a different number of repetitions and Doppler frequencies.

TABLE 1

| Doppler Frequency | Number of Repeats | Number of TBs | Gain (dB) |
| --- | --- | --- | --- |
| 1 Hz | 8 | 8 | 0 |
| 5 Hz | 8 | 8 | 1.5 |
| 10 Hz | 8 | 8 | 1.8 |
| 1 Hz | 32 | 8 | 0.8 |
| 5 Hz | 32 | 8 | 2.4 |
| 1 Hz | 256 | 8 | 2.1 |
| 5 Hz | 256 | 8 | 1.3 |

As can be observed from TABLE 1, interleaving the transport blocks can provide up to 2.4 dB in SNR gain for PUSCH. Furthermore, it can be observed that the SNR gain depends on higher Doppler frequencies and number of repeats.

The dependence of the gain on the Doppler frequency and the number of repeats is linked to the relationship between the transmission time and the channel coherence time. For there to be measurable SNR gain, the transmission time should be close to the channel coherence time. For example, there is no gain for 1 Hz Doppler with 8 repeats because the transmission time with the interleaving is still only 8×8=64 ms long, which is too short when compared to the channel coherence time for a 1 Hz channel. However, for 32 repeats, the transmission time with the interleaving is 8×32=256 ms long and thus shows a gain of 1.5 dB. However, if the transmission length without interleaving is near the coherent time, then there will be less gain from interleaving, which can result in the outcome wherein for 256 repeats there is more gain for interleaving at 1 Hz than at 5 Hz. Given that the larger number of repeats will typically be used for indoor scenarios where the Doppler frequencies are generally low. Furthermore, a smaller number of repeats (in LTE-M CE Mode A) will be used in higher mobility scenarios with higher Doppler frequencies. This linkage between SNR gain to the number of repeats and Doppler is not a limiting factor.

The SNR gain due to interleaving translates into savings with respect to PUSCH resources and UE power consumption savings. For example, with the 2.4 dB SNR gain, approximately 42% savings in PUSCH resources will result which is a larger saving than the MPDCCH savings. Also, since the transmission will be 42% shorter, a 42% savings in UE power consumption can result.

Given the above, the interleaving of transport blocks provides a large (approximately 42%) reduction in PUSCH resources and UE power consumption. It would be readily understood that by applying the same interleaving technique in the downlink is likely to yield similar performance gains and savings of PDSCH resources. Moreover, interleaving transport blocks can provide SNR gains for the PDSCH.

Figures 4A, 4B, 5A, 5B, 5C:
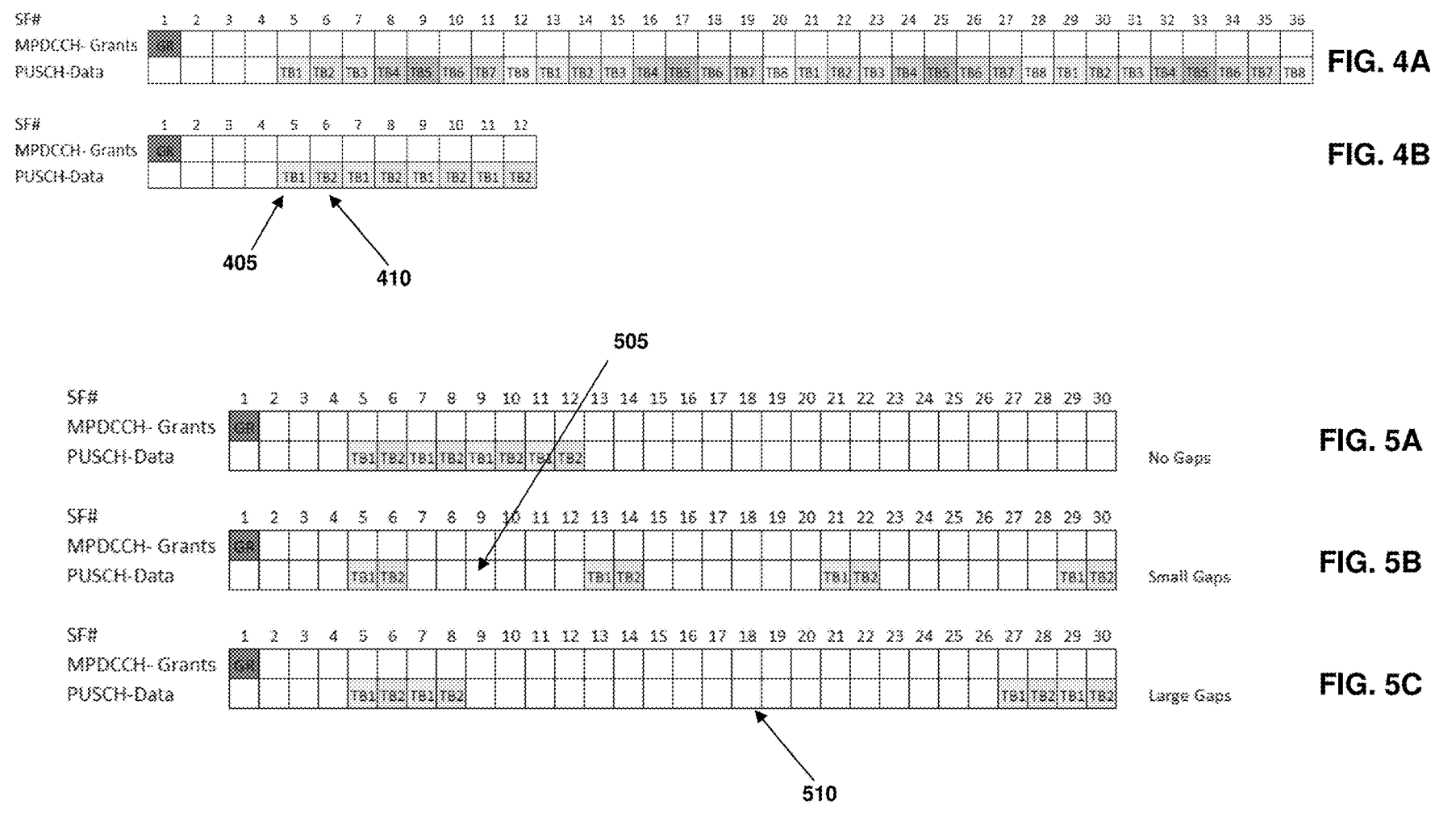

However, if there are less than 8 TBs scheduled there is a reduction in time diversity. For comparison, FIG. 4A illustrates 8 TBs with 4 repeats which has an 8-times increase in time diversity over STBG and FIG. 4B illustrates 2 TB, TB1 405 and TB2 410, with 4 repeats each, resulting in only a 2-times increase in time diversity over STBG. This reduction in time diversity can be a problem when one considers that there are at least two reasons for few TBs to be scheduled. Firstly, there may not be enough data. For example, if the UE doesn't have much data for transmission mode (Tx) or reception mode (Rx), then not many TBs need to be scheduled. The evolved NodeB (eNB) or gNB or other base station configuration, could fragment the data into small TBs to generate more of them, but there is additional overhead (for example, cyclic redundancy check (CRC) overhead and media access control (MAC) overhead) for each TB and the turbo decoder operates more effectively on larger TB sizes. As such, creating smaller TBs in order to have more TBs to provide time diversity is not advisable. Secondly, hybrid automatic repeat request (HARQ) process may not be available. The eNB/gNB can only schedule a TB if the UE has an available HARQ process. For LTE-M CE Mode A, either 8 or 10 HARQ processes are supported but for narrow band internet-of-things (NB-IoT) and LTE-M CE Mode B only 2 HARQ processes are available. For the downlink (DL), adding more HARQ processes requires more random access memory (RAM) so this would not be acceptable as the provision of improved time diversity is desired to be a firmware upgrade and thus preferably not require hardware changes. For the uplink (UL), adding more HARQ processes could be something to consider, however the downlink control information (DCI) size would get bigger. As such, the multiple TB grant (MTBG) mechanism should support up to 8-10 TBs but further be effective for 2 TBs.

In order to determine how much gain, the interleaving of with 2 vs 8 TBs provides, PUSCH LLS were conducted at 5 Hz Doppler. TABLE 2 shows the time diversity gains at the 10% BLER point for different numbers of repetitions and Doppler frequencies when interleaving 8 TBs and 2 TBs.

TABLE 2

| Doppler Frequency | Number of Repeats | Number of TBs | Gain (dB) |
| --- | --- | --- | --- |
| 5 Hz | 8 | 8 | 1.5 |
| 5 Hz | 8 | 2 | 0 |
| 5 Hz | 32 | 8 | 2.4 |
| 5 Hz | 32 | 2 | 0.9 |

TABLE 2-continued

| Doppler Frequency | Number of Repeats | Number of TBs | Gain (dB) |
| --- | --- | --- | --- |
| 1 Hz | 256 | 8 | 2.2 |
| 1 Hz | 256 | 2 | 0.9 |

As can be seen from TABLE 2 there is a significant degradation in performance when only 2 TBs are interleaved when compared to the case of 8 TBs being interleaved.

According to embodiments, in order to improve time diversity, gaps can be scheduled in the PUSCH data transmissions. According to embodiments, other UEs may be scheduled for transmissions to a base station during these gaps. For example, the addition of a small gap after each SF can be provided, for example add 1 SF gap between repeats.

While the insertion of a single gap does increase time diversity, there are potential problems with this particular solution. For example, the gaps are small, and as such it can be difficult to schedule other UE transmissions in these small gaps. In addition, channel estimation is poor. For example, in order to improve channel estimation, cross SF channel estimation is often used. The amount of time used for cross SF channel estimation can depend on the frequency error and on dynamic properties of the mobile channel. For example, if the channel allows 8 ms of cross SF channel estimation to be used, only 4 SF within the 8 ms have data, so only 4 SF (or ½) of the SFs can be used for channel estimation.

FIGS. 5A, 5B and 5C illustrate a case of 2 TBs with 4 repeats, wherein the PUSCH transmissions therefore are illustrated without gaps, with small gaps and with larger gaps. FIG. 5A illustrates a base case where there are no gaps. FIG. 5B illustrates a case where there are small gaps 505 positioned between each of the repeats of the TBs. FIG. 5C illustrates a case where there is a large gap 510 inserted after the second repeat of the TBs.

In order to determine how much gain is achieved by interleaving with gaps, PUSCH LLS were conducted at 5 Hz Doppler. TABLE 3 shows the time diversity gains at the 10% BLER point for different gaps, number of repetitions and Doppler frequencies:

TABLE 3

| Doppler Frequency | Number of Repeats | Number of TBs | Gaps (ms) | Time Diversity | Cross SF Channel Est | Gain (dB) |
| --- | --- | --- | --- | --- | --- | --- |
| 5 Hz | 8 | 2 | 0 ms | 2X | 7 | 0 |
| 5 Hz | 8 | 2 | 7 gaps of 6 ms | 8X | 1 | 0.3 |
| 5 Hz | 8 | 2 | 1 gap of 42 ms | 8X | 7 | 1.8 |
| 5 Hz | 32 | 2 | 0 ms | 2X | 7 | 0.9 |
| 5 Hz | 32 | 2 | 31 gaps of 6 ms | 8X | 1 | 0.8 |
| 5 Hz | 32 | 2 | 1 gap of 186 ms | 8X | 7 | 1.8 |
| 5 Hz | 32 | 2 | 3 gaps of 62 ms | 8X | 7 | 2.7 |
| 1 Hz | 256 | 2 | 0 ms | 2X | 7 | 0.9 |
| 1 Hz | 256 | 2 | 255 gaps of 6 ms | 8X | 1 | −0.8 |
| 1 Hz | 256 | 2 | 1 gap of 1530 ms | 8X | 7 | 2.0 |
| 1 Hz | 256 | 2 | 1 gap of 500 ms | 8X | 7 | 1.8 |

From TABLE 3, it can be determined that small gaps do not perform as well as large gaps because less cross-SF channel estimation can be used. In addition, small gaps can be more difficult to schedule other traffic into and they are less efficient for UEs to go into low power states. It is noted that adding a large gap can provide similar gain when compared to the instance where 8 TBs are available. As such, adding a large gap when <8 TBs are scheduled can provide SNR gains similar to that when 8 TBs are available.

According to some embodiments, in order to improve time diversity, gaps can be scheduled in the PUSCH data transmissions wherein there is a minimum transmission mode (Tx) time and a minimum gap time. As an example, Tx min time can be 8 SF (e.g. 8 ms) and the inserted gap can be 16 SF (e.g. 16 ms), wherein this configuration can allow the cross-SF channel estimation to use all 8 SFs and provides a large 16 SF gap for other UEs to be scheduled therein. This configuration can provide a time diversity of approximately 4 times.

Although adding a gap will reduce the amount of network resources required and also improve UE battery life, it can slow the data speed down which may not be desirable for the underlying applications. However, the data speed can be similar to that of a single grant transmission in certain situations. In this regard, TABLE 4 illustrates calculated data speeds for different scenarios.

TABLE 4

| Schedule TBs | PUSCH Repeats | MPDCCH Repeats | Gap (ms) | SNR Gain (dB) | Data Speed (kbps) |
|---|---|---|---|---|---|
| 1 | 8 | 2 | 0 | 0 | 62.5 |
| 2 | 8 | 2 | 42 | 0 | 30.3 |
| 2 | 8 | 2 | 42 | 1.9 | 46.9 |
| 3 | 8 | 2 | 34 | 1.9 | 70.4 |
| 1 | 32 | 8 | 0 | 0 | 21.7 |
| 2 | 32 | 8 | 100 | 0 | 11.2 |
| 2 | 32 | 8 | 100 | 2 | 17.8 |
| 3 | 32 | 8 | 68 | 2 | 26.7 |
| 1 | 256 | 32 | 0 | 0 | 3.4 |
| 2 | 256 | 32 | 500 | 0 | 1.9 |
| 2 | 256 | 32 | 500 | 2 | 3.0 |
| 3 | 256 | 32 | 244 | 2 | 4.5 |

With reference to TABLE 4, it can be observed that when adding gaps between the TB transmissions, the data speed can depend on the number of scheduled TBs and gap size. For example, as can been seen from TABLE 4, even with the added gaps, when 3 or more TBs are scheduled, the data speed is higher when compared to legacy single TB scheduling. Given this, there is no need for a configuration mechanism of the UE to prefer whether gaps are inserted or not. As such, when 3 or more TBs are scheduled, the data speed can be noted as being higher than for legacy single TB scheduling.

According to embodiments, gaps are inserted between transmissions to enforce time diversity and, meanwhile, maintain a minimum transmission time to provide a sufficient number of sub-frames for cross-sub-frame channel estimation. According to some embodiments, there is provided a method and system for supporting multi TBs with single grants. According to some embodiments, there is provided a system and method which provides for the interleaving of the transmitted TBs when repeats are used. Furthermore, there is provided a method and system wherein when a few TBs are scheduled, a single gap in the transmission is provided in order to increase time diversity.

According to embodiments, the configuration of the minimum Tx time (Tx min) can be determined by considering a number of different factors. For example, for a larger number of repeats which can be associated with coverage enhancement (CE) Mode B, more cross-SF channel estimation can be desired (e.g. 16 SF). Accordingly, the Tx min time can be configurable in a number of different ways. For example, Tx min time can be configurable based on one or more of system information (SI) and radio resource control (RRC). Tx min time can be dependent upon one or more of CE mode, uplink (UL), downlink (DL), and the number of repeats used.

According to embodiments, the size or length of the gap can be configurable. The length of the gap can be determined based on a number of different factors. Time diversity will improve spectral efficiency by reducing the number of repeats needed to transmit the data. This reduction in the number of repeats will result in an improved battery life in particular for uplink transmissions. In addition, in the downlink, depending on the effectiveness of the time diversity, the data rate may be faster with a longer gap than with a shorter gap. The channel model and SNR can be a major factor in determining an optimal gap size. However, the UE may also desire faster data transmission rather than longer battery life. Accordingly, there is a trade-off between data rate, battery life, and spectral efficiency. For example, the length of the gap can be configurable based on one or more of system information (SI) and radio resource control (RRC). As would be understood downlink control information may be considered to be a type of SI. The length of the gap can be dependent upon one or more of CE mode, uplink (UL), downlink (DL), and the number of repeats used. In some embodiments, the length of the gap can be dependent upon the UE.

According to some embodiments, for flexible time diversity, the length of the gap can be specified by the MTBG.

Figure 6:
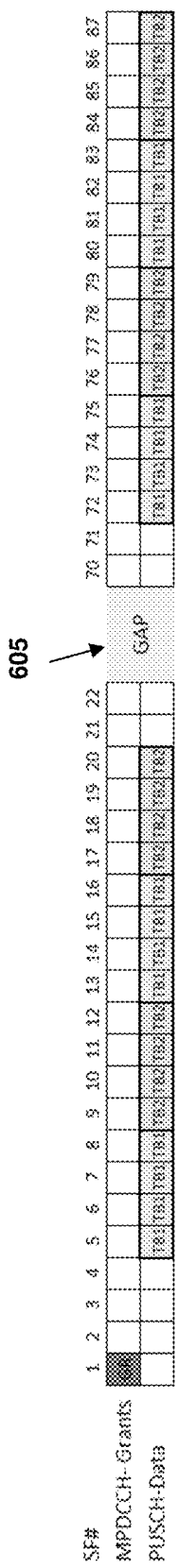
FIG. 6 illustrates the interleaving of 2 TBs with 4 SF of cyclic repetition in accordance with embodiments of the present invention.

Cyclic repetition is used for full-physical resource block (Full-PRB) transmission in LTE-M CE Mode B. In this instance, a primary purpose of cyclic repetition is to enable symbol-level I/Q combining and to improve frequency/timing offset tracking. This advantage can be desired for MTBGs so for CE Mode B the interleaving should be based on 4 SF and not 1 SF. FIG. 6 shows an example for 2 TBs and repeats of 16, including 4 SF cyclic repetition, with a gap of 50 ms 605. Accordingly, it is clear that cyclic repetition can be supported with interleaving.

Figure 7:
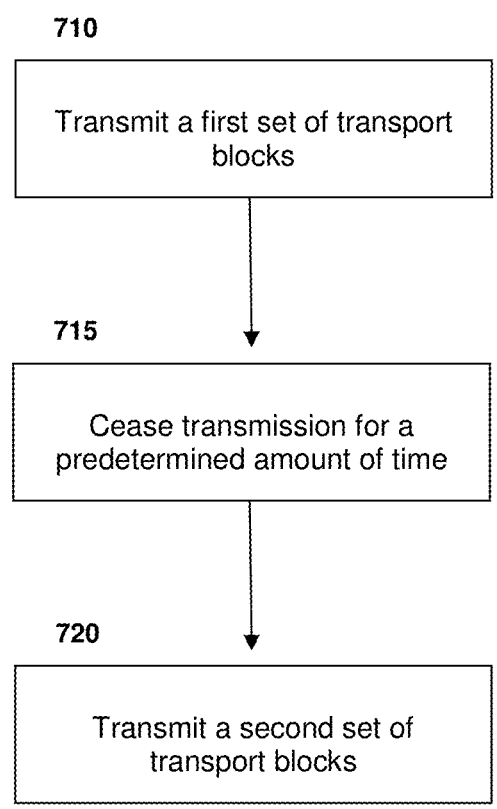
FIG. 7 illustrates a method for multi-transport block grant transmissions including time diversity in accordance with embodiments of the present invention.

FIG. 7 illustrates a method for multi-transport block grant transmissions including time diversity in accordance with embodiments of the present invention. The method for facilitating time diversity for MTBG transmissions includes transmitting by the UE, a first set of transport blocks 710. The method further includes ceasing transmission for a predetermined amount of time 715. In addition, the method includes transmitting by the UE a second set of transport blocks 720, wherein the summation of the first set of transport blocks and the second set of transport blocks defines a complete set of transport blocks.

In some embodiments, transmitting the second set of transport blocks includes, transmitting by the UE a first portion of the second set of transport blocks and ceasing transmission for a second predetermined amount of time. The method further includes transmitting by the UE a second portion of the second set of transport blocks, wherein the summation of the first portion and the second portion defines a complete set of the second set of transport blocks.

As mentioned above, as an LTE-M device is to be simple in design, a UE of this configuration typically cannot do blind decoding of the MPDCCH for different sized DCI messages, for example grants. A DCI can carry information relating at least to transport format, resource allocation and hybrid automatic repeat request (HARQ) information. As such a motivation of using MTBG is to reduce MPDCCH resources that are used to issue grants. However, a potential problem to realize this goal is that the size of the MTBG can grow too large. NB-IoT and LTE-M devices are simple, so a main tenet of operation is that the UE does not have to do blind decoding of the MPDCCH for different sized DCI messages (i.e. grants). This means that if the MTBG grows, in order for the single TB grant (STBG) to be similar in size, the STBG will have to be padded and thus grow as well. As if the MTBG grows too big, and given it is not used all the time, this may in fact increase MPDCCH resource usage, which is the opposite of the motivation for the use of MTBG. For example, currently the STBG size for LTE-M in CE Mode A is 35 bits per grant (e.g. MTBG would be disabled). If the MTBG adds 10 bits and is used only 5% of the time, when the MTBG is enabled then the approximate number of bits per grant when the MTGB is enabled may be equal to STBG average+MTBG average=(35+10+*0.95+(35+10)/4*0.05=43 bits per grant, and thus more MPDCCH resources would be used than if solely STBG was allowed. As can be seen these calculations assume 4 TB are scheduled per MTBG. In light of the above, it is important to keep the MTBG from growing much larger than the STBG.

For example, it can be desired that for each TB the following fields would be duplicated in MTBG; MCS—4 bits; HARQ ID—3 bits; RV—2 bits; New data indication—1 bit; HARQ-ACK resource offset—2 bits. Assuming up to 8 TBs could be granted per MTBG, this would add 84 extra bits.

According to embodiments, there are provided multiple techniques for at least in part reducing the downlink control information (DCI) size for MTBG.

As such, according to some embodiments, the size of the MTBG is configured such that is does not exceed the size of a STBG by more than a few bits in order that the MTBG feature can save MPDCCH resources.

According to embodiments, the downlink control information (DCI) is configured to include at least one multi-transport block identifier which can be configured to indicate information indicative of one or more techniques being used in order to reduce the DCI size at least when MTBG are being enabled. According to embodiments, one or more of the following techniques can be used for at least in part reducing the DCI size for MTBG. These techniques can include one or more of: the use of a multi-grant (MG) flag bit; using the same modulation and coding scheme (MCS) for all of the TBs; limiting the number of MCS choices for use; using the same resources for all of the TBs; reducing the number of resource choices for use; identification of the HARQ process numbers being scheduled; identification of HARQ retransmission and identification of HARQ-ACK resource offset.

According to some embodiments, a MG flag bit can be used. For example, there are some single TB grant (STBG) fields that may not be needed for MTBG. To allow these bits to be redefined and re-purposed for a MTBG, a high-level flag indicating if the grant is a STBG or MTBG can be added. This will increase the DCI by 1 bit.

According to some embodiments, the same MCS can be used for all TBs. For example, the MCS field is used to designate the modulation and number data bits in the TB. If the same MCS is used for all TB in the MTBG, then this field does not need to be duplicated for each TB. This means that there may be some leftover data bits that would need to be scheduled with a STBG, however this may be considered to be no different than if all grants were STBG in terms of number of bits in the DCI.

According to some embodiments, there is a limited number of MCS that can be used. For example, the MCS field for LTE-M in CE mode A is 4 bits or 16 choices to provide a wide range of TB sizes. The eNB, gNB or other base station configuration, can only use MTBG if there is a sufficiently large number of required bits to transmit/receive (i.e. need 2× the maximum TBs of 1000 bits for LTE-M in CE mode A). As such, in general the MTBG will only be used with large TB sizes. Accordingly, the MCS options can be limited to a few of the larger TBs or even limited to just one value. These values could be RRC configured or specified in the standard.

According to some embodiments, the same resources can be used for all TBs. For example, the resource field in the DCI specifies the resources used in frequency (i.e. the narrowband and the PRB(s) location used). If the same resource field is used for all TBs in the MTBG, then this field does not need to be duplicated for each TB. There is no foreseen downside for doing this as any information about channel (i.e. frequency selective scheduling) should be applied at the time of the MTBG i.e. there is no further channel information given to the eNB or gNB or other base station configuration, after the transmission starts.

According to some embodiments, there is a limited number of resources that are available for selection. The narrowband choices should not be limited as to support frequency selective scheduling but since the TBs will be larger, some of the smaller options for PRBs (e.g. 1 PRB) could be eliminated to save DCI bits because these small PRB options do not provide an optimal code rate of 1/3. For example, in the DL, the number of PRBs can be limited to 4 or 6 PRBs or just 6 PRBs as this can provide a desired code rate when no repeats are used and a desired coverage performance when repeats are used. For the UL, it can be more complicated as the UE has limited power. Accordingly, it is more spectrally efficient to use fewer PRBs and rely on RVs to increase the code rate. One method is to map the number of PRBs based on the number of repeats and modulation. TABLE 5 an example where >936 bits are used for the TBs and full-PRB transmission is used.

TABLE 5

| # of repeats and modulation | # of PRBs |
|---|---|
| 1 QAM | 6 |
| 1 QPSK | 6 |
| 2 QPSK | 6 |
| >=4 QPSK | 2 |

However, it is considered that the location of the PRBs within the narrowband needs to be specified. For example, for 2 PRBs, there are 3 non-overlapping locations within the narrowband so 2 bits within the DCI are needed to indicate this to the UE.

According to some embodiments, there is an identification in the DCI of the HARQ process numbers being scheduled. For example, scheduling up to 8 TB per MTBG is likely to be supported, so the DCI needs to indicate which of the 8 HARQ process numbers it is scheduling. The most flexible method is to include all 8 HARQ IDs of 3 bits each but this would increase DCI size significantly (7*3=21 bits). According to some embodiments the DCI size can be reduced by using an 8-bit mask indicating which HARQ IDs are being scheduled. According to some embodiments the DCI size can be reduced by indicating only the starting HARQ ID and the number of TBs, which may be defined using 8 bits for example. According to some embodiments the DCI size can be reduced by hard coding the starting HARQ ID to zero and only specifying the number of TBs, which may be defined by 3 bits, which can be appropriate for up to 8 TBs per MTBG.

According to some embodiments there is an identification in the DCI of the HARQ retransmission. For example, if a MTBG can be used to schedule HARQ retransmissions as well as new transmissions, then the following fields need to be duplicated for each TB (i.e. ×8). The Redundancy Version (RV) can be defined by 2 bits and the presence of new data can be defined by 1 bit. This would require a significant number of bits to be included in the DCI, so some HARQ re-scheduling limitations are desired. In some embodiments, HARQ re-scheduling limitations can include defining that a MTBG can only schedule new or re-transmissions (not both in one grant) then the NDI field duplication is not needed. In some embodiments, HARQ re-scheduling limitations can include defining that a MTBG can only schedule re-transmission with the same RV, then the RV field does not need to be duplicated per TB. In some embodiments, HARQ re-scheduling limitations can include defining that a MTBG is unable to schedule re-transmission. For example, re-transmission can be scheduled via STBG only. In some embodiments these options for HARQ re-scheduling limitations may be combined, for example a MTBG can only schedule new or re-transmissions (not both in one grant) and the MTBG can only schedule re-transmission with the same RV, then both the NDI field and the RV field do not need to be duplicated per TB.

According to some embodiments there is an identification of the HARQ-ACK resource offset. For example, the DL Grant includes the PUCCH resource offset that the UE will use to send an ACK. If the same HARQ-ACK resource offset is used for all HARQ-ACKs in the MTBG, then this field does not need to be duplicated for each TB. This would not cause any degradation in acknowledgement reception performance and should not cause harmful limits on the scheduler's flexibility.

It will be understood that the embodiments defined above can equally be applicable to UL grants, DL grants, sub physical resource blocks (PRBs) grants, full PRB grants, and applicable to LTE-M devices and NB-IoT devices.

As an example, the following discusses DCI configuration for MTBG, wherein the DCI has been increased in size by 1 bit when compared to STBG. For the UL grant FDD LTE-M CE Mode A using one or more the above disclosed techniques, the MTBG DCI design can be as defined in TABLE 6, wherein the MTBG indicator bit, is equal to "0" indicating that the grant is for a single TB.

TABLE 6

| Field Name | Bits | Description |
| --- | --- | --- |
| PRB Assignment | 5 | Legacy |
| MCS index | 4 | Legacy |
| RV | 2 | Legacy |
| HARQ process # | 3 | Legacy |
| New data indicator | 1 | Legacy |
| Total Bits | 15 | |

For the UL grant FDD LTE-M CE Mode A using the above disclosed techniques, the following DCI design for MTBG can be as defined in TABLE 7, wherein the MTBG indicator bit, is equal to "1" indicating that the grant is for multiple TBs.

TABLE 7

| Field Name | Bits | Description |
| --- | --- | --- |
| PRB Assignment | 2 | 3 non-overlapping locations for PRB within narrowband |
| MCS Index | 2 | QAM or QPSK, 2 TBS sizes configured by RRC |
| RV | 2 | Same RV for all TBs |
| HARQ Process Mask | 8 | HARQ ID Mask - "1" indicates TB is being scheduled for the HARQ ID |
| New data indicator | 1 | Same NDI for all TB |
| Total Bits | 15 | |

Having regard to the above, it is noted that the remaining DCI fields are unchanged for legacy UEs. These remaining DCI fields can include a flag for UL/DL grant differentiation, narrowband index of resource block assignment, repetition number, FH hopping flag, TPC command for scheduled PUSCH, CSI request, SRS request, DCI subframe repetition number and modulation order override.

As a further example, the following discusses the DCI configuration for MTBG, wherein the DCI has been increased in size by 1 bit when compared to STBG. For the UL grant LTE-M CE Mode B using the above disclosed techniques, the DCI design for MTBG can be as defined in TABLE 8, wherein the MTBG indicator bit, is equal to "0" indicating that the grant is for a single TB. It is noted that in this mode only two HARQs are supported.

TABLE 8

| Field Name | Bits | Description |
| --- | --- | --- |
| PRB Assignment | 3 | Legacy |
| MCS index | 4 | Legacy |
| RV | 2 | Legacy |
| HARQ process # | 1 | Legacy |
| New Data Indicator | 1 | Legacy |
| Total Bits | 11 | |

For the UL grant LTE-M CE Mode B using the above techniques, the following DCI design for MTBG can be as defined in TABLE 9, wherein the MTBG indicator bit, is equal to "1" indicating that the grant is for multiple TBs.

TABLE 9

| Field Name | Bits | Description |
| --- | --- | --- |
| PRB Assignment | 2 | 3 locations for PRB within narrowband |
| MCS Index | 2 | QAM or QPSK, 2 TBS sizes configured by RRC |
| RV | 2 | Same RV for all TBs |
| HARQ Process Mask | 2 | HARQ ID Mask - "1" indicates TB is being scheduled for the HARQ ID |
| New data indicator | 1 | Same NDI for all TB |
| GAP Size | 2 | 4 gap values. RRC configured value e.g. 48 ms |
| Total Bits | 11 | |

Having regard to the above, it is noted that the remaining DCI fields are unchanged for legacy UEs. These remaining DCI fields can include a flag for UL/DL grant differentiation, narrowband index of resource block assignment, repetition number and DCI subframe repetition number.

Figure 8A:
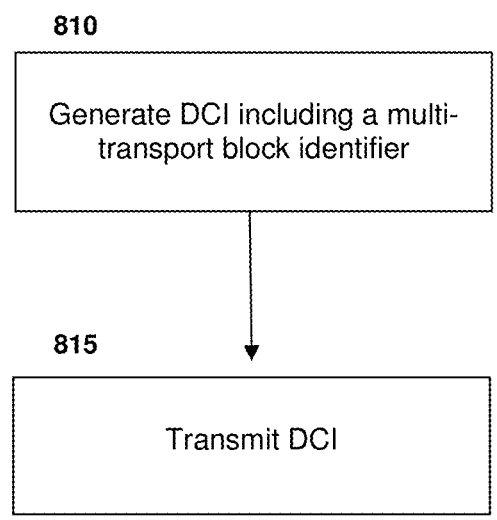
FIG. 8A illustrates a method for downlink control information (DCI) formation for multi-transport block grant transmissions in accordance with embodiments of the present invention.

FIG. 8 illustrates a method for downlink control information (DCI) formation for multi-transport block grant transmissions in accordance with embodiments of the present invention. The method for granting multi-transport block grant (MTBG) transmissions in a wireless communication system includes generating 810, by a base station, a downlink control information, DCI, wherein the DCI is for transmission by the base station with a grant. The DCI includes at least one multi-transport block identifier, wherein the at least one multi-transport block identifier is configured to indicate information indicative of one or more techniques being used in order to reduce the DCI size at least when MTBG are being enabled. According to embodiments, the techniques for at least in part reducing the DCI size for MTBG can include one or more of: the use of a multi-grant (MG) flag bit; using the same modulation and coding scheme (MCS) for all of the TBs; limiting the number of MCS choices for use; using the same resources for all of the TBs; reducing the number of resource choices for use; identification of the HARQ process numbers being scheduled; identification of HARQ retransmission and identification of HARQ-ACK resource offset. The method further includes transmitting 815, by the base station, the DCI to a UE.

Figure 8B:
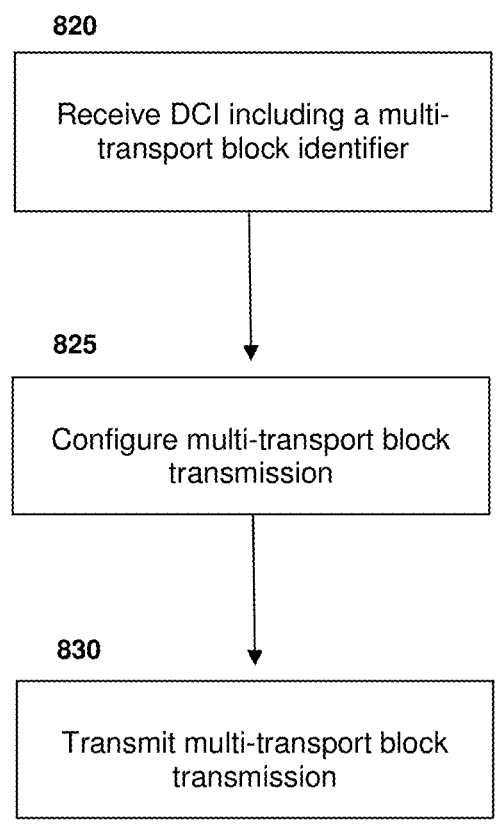
FIG. 8B illustrates a method for multi-transport block transmissions based on downlink control information (DCI) for multi-transport block grant transmissions in accordance with embodiments of the present invention.

FIG. 8B illustrates a method for multi-transport block transmissions based on downlink control information (DCI) for multi-transport block grant transmissions in accordance with embodiments of the present invention. The method includes receiving 820, by a user equipment, UE, a downlink control information, DCI, the DCI including at least one multi-transport block identifier, wherein the at least one multi-transport block identifier is configured to indicate information indicative of one or more techniques being used in order to reduce the DCI size at least when MTBG is enabled. According to embodiments, the techniques for at least in part reducing the DCI size for MTBG can include one or more of: the use of a multi-grant (MG) flag bit; using the same modulation and coding scheme (MCS) for all of the TBs; limiting the number of MCS choices for use; using the same resources for all of the TBs; reducing the number of resource choices for use; identification of the HARQ process numbers being scheduled; identification of HARQ retransmission and identification of HARQ-ACK resource offset. The DCI is received by the UE with a grant. The method further includes configuring 825, by the UE, the multi-transport block transmission, the configuring based at least in part on the at least one multi-transport block identifier and transmitting 830, by the UE, the multi-transport block transmission to a base station. According to embodiments, the techniques for at least in part reducing the DCI size for MTBG can include one or more of: the use of a multi-grant (MG) flag bit; using the same modulation and coding scheme (MCS) for all of the TBs; limiting the number of MCS choices for use; using the same resources for all of the TBs; reducing the number of resource choices for use; identification of the HARQ process numbers being scheduled; identification of HARQ retransmission and identification of HARQ-ACK resource offset.

Various embodiments of the present invention relate to an apparatus or system of apparatuses. An apparatus may take the form of a communication device in a wireless communication system supporting one or both of gap insertion and DCI reconfiguration, such as an LTE wireless communication system. In some embodiments, the communication device is a wireless subscriber terminal, such as a user equipment (UE), handheld cell phone, PDA, M2M device, or the like. In some embodiments, the communication device is a base station, such as an eNB, gNB or other base station configuration.

As will be readily understood by a worker skilled in the art, a communication device may comprise various structural elements, such as a power source, microprocessor, memory, signal processing section, radiofrequency (RF) electronics section, antenna, and the like. In various embodiments, an existing communication device, such as a UE, M2M device, eNB, gNB, base station, or the like, which is configured to operate in a wireless communication system such as an LTE system, may be further configured to perform various operations such as gap insertion and DCI reconfiguration, in accordance with the present invention. Such configurations may be via new software routines loaded into memory of the device and used to guide operation thereof, or similarly via new firmware routines loaded into memory for use by appropriate components such as a microcontroller or digital signal processor. Additionally or alternatively, configuration may be performed by incorporating appropriate specialized hardware, such as electronic components, microcontrollers, logic arrays, signal processing electronics, or the like, into the device. A worker skilled in the art would understand how to adjust operation of an existing communication device or to create a new communication device having the desired operating characteristics as described herein.

Figure 9:
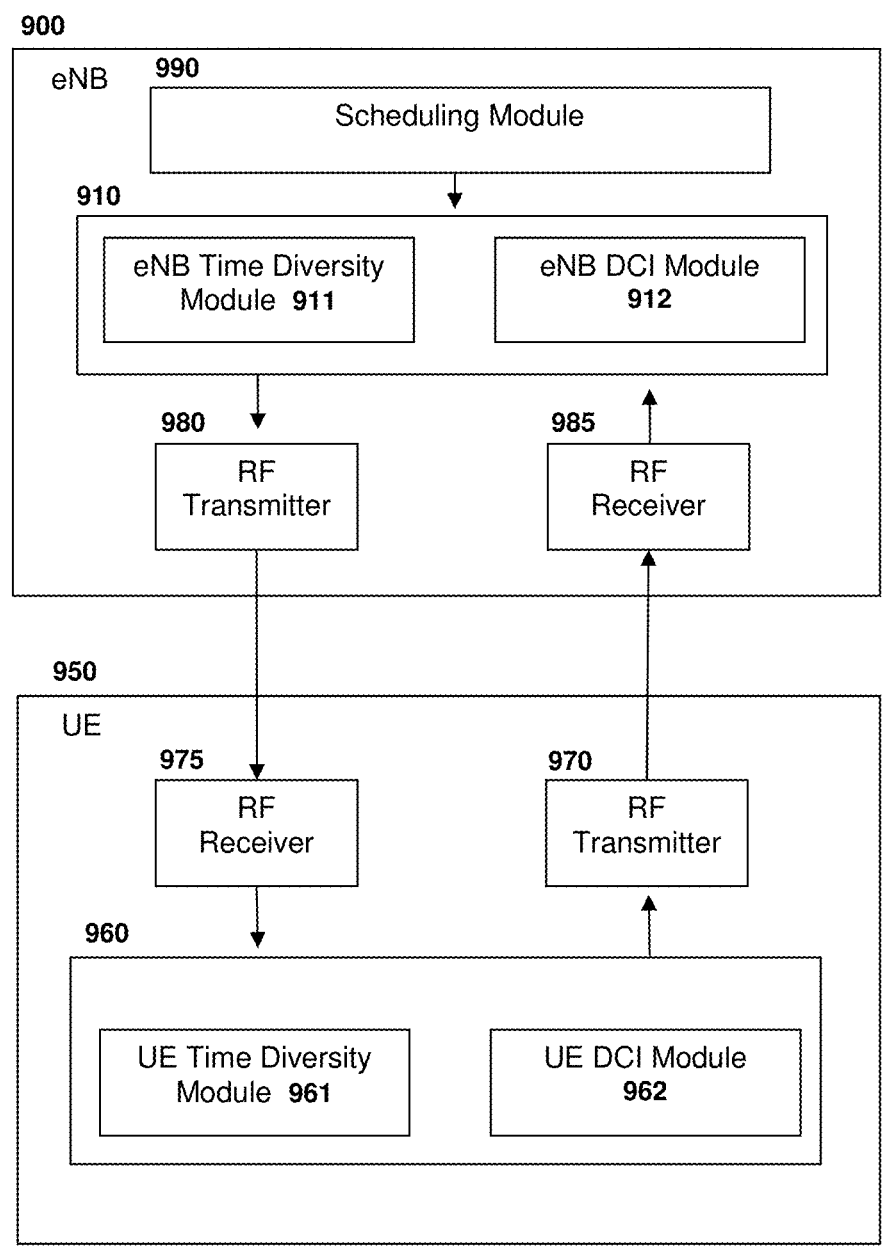
FIG. 9 illustrates a system provided in accordance with embodiments of the invention.

FIG. 9 illustrates a system comprising an evolved Node B (eNB) or gNB or other base station configuration 900 and a user equipment (UE) 950 in a wireless communication system, for example a Long Term Evolution (LTE) communication system. The UE 950 comprises a UE communication module 960, which can include one or both of a UE time diversity module 961, and a UE DCI module 962. The UE time diversity module 961 is configured to insert one or more gaps in the TB transmissions, and the UE DCI module 962 is configured to decode the DCI configuration for MTBG. The UE 950 further comprises various other features such as a wireless communication module, comprising a RF transmitter 970 and RF receiver 975, the wireless communication module configured to facilitate communication with the eNB via an appropriate protocol, such as LTE. Other functionalities of a UE configured to operate in accordance with a standard such as LTE would be readily understood by a worker skilled in the art.

The eNB 900 comprises an eNB communication module 910 which can include one or both of an eNB time diversity module 911, and an eNB DCI module 912. The eNB time diversity module 911 is configured to act upon one or more gaps in the TB transmissions, and the eNB DCI module 912 is configured to modify the DCI configuration for MTBG. The eNB 900 further comprises various other features such as a wireless communication module, comprising a RF transmitter 980 and RF receiver 985, the wireless communication module configured to facilitate communication with the UE via an appropriate protocol, such as LTE. The eNB further comprises a scheduling module 990 which is configured to perform resource assignment scheduling and re-scheduling, as would be readily understood by a worker skilled in the art. Other functionalities of an eNB configured to operate in accordance with a standard such as LTE would be readily understood by a worker skilled in the art.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method for granting a multi-transport block grant (MTBG) transmission in a wireless communication system, the method comprising:
   generating, by a base station, a downlink control information (DCI), the DCI including at least one multi-transport block identifier indicative of one or more techniques applicable for the MTBG transmission, the one or more techniques including using same physical resource blocks (PRBs) in frequency and same modulation and coding scheme (MCS) for all transport blocks to be transmitted by a user equipment (UE) without duplicating information indicative of the same PRBs in frequency and the same MCS in each transport block; and
   transmitting, by the base station, the DCI to the UE.

2. The method according to claim 1, wherein the one or more techniques include using a flag bit, wherein the flag bit has a first value when a grant transmission is indicative of the MTBG transmission.

3. The method according to claim 1, wherein the one or more techniques include using a hybrid automatic repeat request (HARQ) indicator, wherein the HARQ indicator defines a HARQ process number to be used by a UE subsequent to receipt of the grant for the multi-transport block grant (MTBG) transmission.

4. A base station comprising:
   a processor; and
   machine readable memory storing machine executable instructions which when executed by the processor configure the base station to:
      generate a downlink control information (DCI), the DCI including at least one multi-transport block identifier indicative of one or more techniques applicable for a multi-transport block grant (MTBG) transmission, the one or more techniques including using same physical resource blocks (PRBs) in frequency and same modulation and coding scheme (MCS) for all transport blocks to be transmitted by a user equipment (UE) without duplicating information indicative of the same PRBs in frequency and the same MCS in each transport block; and
      transmit the DCI to the UE.

5. A method for a multi-transport block transmission in a wireless communication system, the method comprising:
   receiving, by a user equipment (UE), a downlink control information (DCI), the DCI including at least one multi-transport block identifier indicative of one or more techniques applicable for the multi-transport block transmission, the one or more techniques including using same physical resource blocks (PRBs) in frequency and same modulation and coding scheme (MCS) for all multi-transport block transmissions to be transmitted by the UE without duplicating information indicative of the same PRBs in frequency and the same MCS in each transport block;
   configuring, by the UE, the multi-transport block transmission, the configuring based at least in part on the at least one multi-transport block identifier; and
   transmitting, by the UE, the multi-transport block transmission to a base station.

6. The method according to claim 5, wherein the one or more techniques include using a flag bit, wherein the flag bit has a first value when a grant transmission is indicative of a multi-transport block grant (MTBG) transmission.

7. The method according to claim 5, wherein the one or more techniques include using a hybrid automatic repeat request (HARQ) indicator, wherein the HARQ indicator defines a HARQ process number to be used by the UE for the multi-transport block transmissions.

8. The method according to claim 5, wherein the one or more techniques include using a hybrid automatic repeat request (HARQ) indicator, wherein the HARQ indicator defines a HARQ-acknowledgement resource offset to be used by the UE subsequent to receipt of the grant for multi-transport block grant (MTBG) transmissions.

9. A user equipment (UE), comprising:
   a processor; and
   machine readable memory storing machine executable instructions which when executed by the processor configure the UE to:
      receive a downlink control information (DCI), the DCI including at least one multi-transport block identifier indicative of one or more techniques applicable for multi-transport block transmission, the one or more techniques including using same physical resource blocks (PRBs) in frequency and same modulation and coding scheme (MCS) for all multi-transport block transmissions to be transmitted by the UE without duplicating information indicative of the same PRBs in frequency and the same MCS in each transport block;

configure the multi-transport block transmission, the configuring based at least in part on the at least one multi-transport block identifier; and transmit the multi-transport block transmission to a base station.

10. The UE according to claim 9, wherein the one or more techniques include using a flag bit, wherein the flag bit has a first value when a grant transmission is indicative of a multi-transport block grant (MTBG) transmission.

11. The UE according to claim 9, wherein the one or more techniques include using a hybrid automatic repeat request (HARQ) indicator, wherein the HARQ indicator defines a HARQ process number to be used by the UE for the multi-transport block transmission.

12. A method for a multi-transport block grant (MTBG) transmission in a wireless communication system, the method comprising:

receiving, by a user equipment (UE), a downlink control information (DCI), the DCI including one or more multi-transport block identifiers, wherein one of the one or more multi-transport block identifiers is a resource indicator field and a modulation and coding scheme (MCS) indicator field, the resource indicator field defining same physical resource blocks (PRBs) in frequency for use by the UE for transmitting all transport blocks without duplicating information indicative of the same PRBs in frequency in each transport block, the MCS indicator field defining same MCS for use by the UE for transmitting all transport blocks without duplicating information indicative of the same MCS in each transport block, and transmitting, by the UE, the multi-transport block transmission to a base station.

* * * * *